United States Patent
Yu (10) Patent No.: US 12,123,962 B2
(45) Date of Patent: Oct. 22, 2024

(54) POSITIONING METHOD AND APPARATUS FOR TERMINAL, USING VARIOUS DATA COMBINATIONS

(71) Applicant: Korea Railroad Research Institute, Uiwang-si (KR)

(72) Inventor: Seung Min Yu, Gyeonggi-do (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 365 days.

(21) Appl. No.: 17/505,077

(22) Filed: Oct. 19, 2021

(65) Prior Publication Data

US 2022/0034990 A1 Feb. 3, 2022

Related U.S. Application Data

(63) Continuation of application No. PCT/KR2020/007004, filed on May 29, 2020.

(30) Foreign Application Priority Data

Aug. 14, 2019 (KR) .................. 10-2019-0099280

(51) Int. Cl.
*G01S 5/00* (2006.01)
*H04B 17/318* (2015.01)
(Continued)

(52) U.S. Cl.
CPC .......... *G01S 5/0063* (2013.01); *H04B 17/318* (2015.01); *H04W 24/10* (2013.01); *H04W 64/00* (2013.01)

(58) Field of Classification Search
CPC .... G01S 5/0063; H04B 17/318; H04W 24/10; H04W 64/00
(Continued)

(56) References Cited

U.S. PATENT DOCUMENTS

| 2012/0072106 A1 | 3/2012 | Han et al. |
| 2015/0029945 A1 | 1/2015 | Do et al. |

(Continued)

FOREIGN PATENT DOCUMENTS

| JP | 2016-531290 A | 10/2016 |
| KR | 10-2012-0010114 A | 2/2012 |

(Continued)

OTHER PUBLICATIONS

International Search Report for PCT/KR2020/007004 dated Nov. 19, 2020 [PCT/ISA/210].

*Primary Examiner* — Joel Ajayi
(74) *Attorney, Agent, or Firm* — Sughrue Mion, PLLC (57) ABSTRACT

A positioning method and apparatus for positioning a terminal by using various data combinations are disclosed. The present disclosure in at least one embodiment provides a positioning terminal by using data combinations, including a data collection unit for collecting n access point (AP) scan data items from each of n APs (n is a natural number), a combination generation unit for generating a plurality of data combinations by combining the n AP scan data items in units of k (k is integers from 3 up to n), a position estimation unit for estimating a plurality of preliminary positions of the terminal from the plurality of data combinations, a clustering unit configured to cluster the plurality of preliminary positions into at least one cluster according to distances or densities of the plurality of preliminary positions, and a position determination unit for determining a final position of the terminal based on at least one cluster.

20 Claims, 7 Drawing Sheets

(51) Int. Cl.
*H04W 24/10* (2009.01)
*H04W 64/00* (2009.01)

(58) Field of Classification Search
USPC ....................................................... 455/456.1
See application file for complete search history.

(56) References Cited

U.S. PATENT DOCUMENTS

| | | |
|---|---|---|
| 2015/0181381 A1 | 6/2015 | Prechner et al. |
| 2016/0044718 A1 | 2/2016 | Do et al. |
| 2016/0165566 A1 | 6/2016 | Jung |

FOREIGN PATENT DOCUMENTS

| | | |
|---|---|---|
| KR | 10-2014-0135313 A | 11/2014 |
| KR | 10-1606382 B1 | 3/2016 |
| KR | 10-2016-0044534 A | 4/2016 |
| KR | 10-2018-0010545 A | 1/2018 |

POSITIONING METHOD AND APPARATUS FOR TERMINAL, USING VARIOUS DATA COMBINATIONS

CROSS-REFERENCE TO RELATED APPLICATION

This application is a continuation of PCT Patent Application PCT/KR2020/007004 filed May 29, 2020, which claims priority from Korean Patent Application No. 10-2019-0099280 filed on Aug. 14, 2019. The aforementioned patent applications is incorporated by reference herein in their entirety.

TECHNICAL FIELD

The present disclosure in some embodiments relates to a positioning method and apparatus for positioning a terminal by using various data combinations. More particularly, the present disclosure relates to a positioning method and a positioning apparatus that determine a position of a terminal by combining data received from a plurality of access points (APs), estimating and then clustering a plurality of preliminary positions of the terminal to determine the final position thereof.

BACKGROUND

The statements in this section merely provide background information related to the present disclosure and do not necessarily constitute prior art.

Among indoor positioning methods using wireless signals, the most commonly used method is to use a signal received by a terminal from access points (APs) to find distances between the terminal and the APs and perform multilateration including triangulation on those distances to estimate the position of the terminal.

On the other hand, in the indoor positioning method, there is a fingerprint technique in addition to multilateration. The fingerprint technique is to estimate the position of a terminal up for positioning by generating a radio map in advance in which the terminal records the strength of signals received from a plurality of APs for each specific indoor position, and then, comparing the strength of the signal received by the terminal at a specific position with the recorded positions and signal strengths on the radio map.

However, in the fingerprint technology where an AP is relocated or an AP is added or removed, mismatching may occur between the AP used for positioning of the terminal and the AP recorded on the radio map, resulting in a reduced positioning accuracy the statements in this section merely provide background information related to the present disclosure and do not necessarily constitute prior art.

To relieve the position estimation error due to these factors, the fingerprint technique requires a new generation or frequent update of the radio map, which takes a lot of money and time for the generation and maintenance of the radio map according to the change of the surrounding environment.

Therefore, there is a need to avoid a radio map to make in the first place, or even if it is made, there is a need to implement a function of increasing the update period of the radio map even with changes in the position, number, or state of the APs to reduce the maintenance cost and repair cost of the radio map.

Korean Patent Application Publication No. 10-2019-0037587 (published Apr. 8, 2009) entitled "Method and Apparatus for Measuring Position of Terminal" is disclosed as prior art for improving positioning accuracy by selecting a base station that is likely to cause a terminal positioning error and positioning the terminal with a combination of valid base stations alone.

However, this prior art is to exclude the base station that is prone to cause an error in the first place and block the same base station from being used as an informant, resulting in a limit to the improvement in positioning accuracy of the terminal.

Therefore, there is a need to further improve the accuracy of positioning of the terminal by using not only information of the base station that does not cause an error but also information of the error-prone base station with the use of a data processing scheme.

Additionally, depending on the communication module installed in the terminal and the APs, RSSI value or timing data, e.g., Round Trip Time (RTT), Time of Arrival (ToA), Time Difference of Arrival (TDoA), or Time of Flight (ToF), etc.) may include a bias value. This bias value is a factor that can increase an error in measuring the exact position of the terminal.

Therefore, to accurately determine the position of the terminal, there is a need to remove the bias value of the RSSI or timing data due to modules responsible for communications between the terminal and the APs.

SUMMARY

At least one aspect of the present disclosure provides a positioning terminal by using one or more data combinations, including a data collection unit, a combination generation unit, a position estimation unit, a clustering unit, and a position determination unit. The data collection unit is configured to collect n access point (AP) scan data items from each of n APs (where n is a natural number), The combination generation unit is configured to generate a plurality of data combinations by combining the n AP scan data items in units of k (where k is at least one integer from 3 up to n). The position estimation unit is configured to estimate a plurality of preliminary positions of the terminal from the plurality of data combinations. The clustering unit is configured to cluster the plurality of preliminary positions into at least one cluster according to distances or densities of the plurality of preliminary positions. The position determination unit is configured to determine the final position of the terminal based on at least one cluster.

Another aspect of the present disclosure provides a positioning server for positioning by using one or more data combinations, including a communication unit, a combination generation unit, a combination generation unit, a position estimation unit, a clustering unit, and a position determination unit. The communication unit is configured to receive, from a terminal, n access point (AP) scan data items collected by the terminal from each of n APs (n is a natural number). The combination generation unit is configured to generate a plurality of data combinations by combining the n AP scan data items in units of k (where k is at least one integer from 3 up to n). The position estimation unit is configured to estimate a plurality of preliminary positions of the terminal from the plurality of data combinations. The clustering unit is configured to cluster the plurality of preliminary positions into at least one cluster by distance or density. The position determination unit is configured to determine the final position of the terminal based on at least one cluster.

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The present disclosure in some embodiments seeks to provide a method and apparatus for positioning a terminal by not making a radio map for terminal positioning, and instead using a combination of AP scan data items to obviate the need for a radio map preparation and thereby reduce the maintenance cost and repair cost for terminal positioning.

The present disclosure in other embodiments seeks to provide a method and apparatus for positioning a terminal by making a radio map for terminal positioning and combining AP scan data items including Received Signal Strength Indicators (RSSIs), timing data, MAC address, SS ID, etc. in positioning the terminal despite changes in the position, number, or state of the APs to increase the update period of the radio map, thereby reducing the maintenance cost and repair cost of the radio map for terminal positioning.

The embodiments of the present disclosure seek to provide a method and apparatus for positioning the terminal by using the AP scan data inclusive of an error-prone AP and further deriving a plurality of preliminary positions of the terminal from data combinations of the multiple AP scan data items from the multiple APs, thereby improving the accuracy of positioning.

Yet other embodiments of the present disclosure seek to provide a method and apparatus for positioning a terminal by removing bias values included in RSSIs or timing data among the AP scan data received from the multiple APs to correct the AP scan data, thereby improving the accuracy and reliability of the terminal positioning.

Figure 1:
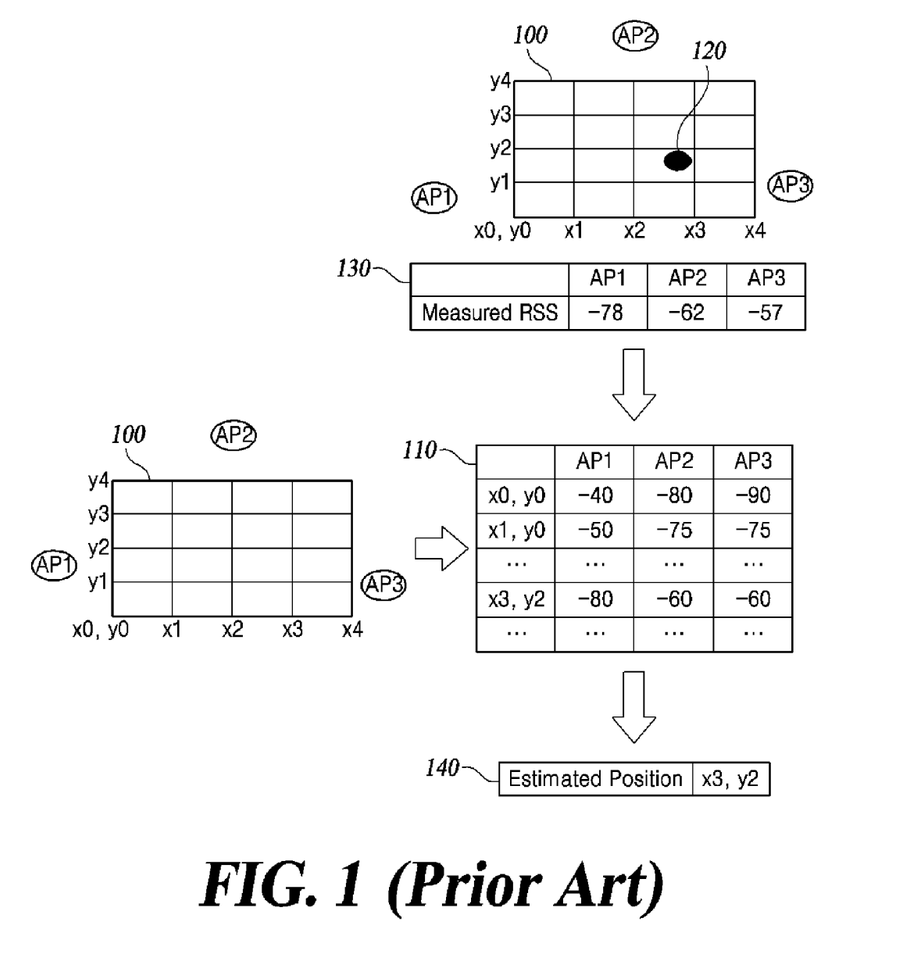
FIG. 1 is a diagram of a conventional positioning method using a fingerprint technique.

FIG. 1 is a diagram of a conventional positioning method using a fingerprint technique.

FIG. 1 illustrates a coordinate system 100 in which an arbitrary area is divided into a certain grid, and every corner of the grid is assigned a specific reference position (coordinates).

Before measuring the position of a terminal, the fingerprint technique generates a radio map 110 first by using received signal strength indicators (RSSIs) of APs each received from each AP by the terminal at each of the reference positions of the coordinate system 100. In other words, the radio map 110 refers to a table that holds records of the RSSIs of the radio signals received from each AP by the terminal at each of the reference positions. In general, the radio map 110 is stored in a server.

Thereafter, a position-requesting terminal 120 located in the coordinate system 100 may measure the strengths of signals from the APs received by the position-requesting terminal 120 at its position. The position-requesting terminal 120 sends the server an RSSI value measured in relation to each AP in the form of an RSSI table 130. The server compares the RSSI table 130 received from the position-requesting terminal 120 with the RSSI for each coordinate value stored in the radio map 110. The server derives from the radio map 110 the coordinates corresponding to the RSSI value most similar to the RSSI table 130.

The server may estimate the coordinates derived from the radio map 110 as the final position of the position-requesting terminal 120 and transmit the estimated position to the position-requesting terminal 120, thereby informing the position-requesting terminal 120 of its position.

As illustrated in FIG. 1 to the left, the coordinate system 100 made in an arbitrary area is divided by the coordinates (x0, y0) to the coordinates (x4, y4) and surrounded by three APs that can be used for position estimation.

Before positioning the terminal, the server generates and stores the RSSI table 130 that holds records of the RSSI values measured from AP1, AP2, and AP3 by the terminal at the respective reference positions of the coordinate system 100.

Then, as illustrated in FIG. 1 to the top, the RSSI values measured by the position-requesting terminal 120 in relation to AP1, AP2 and AP3 are −78 [dBm], −62 [dBm] and −57 [dBm], respectively. The position-requesting terminal 120 writes these values into the RSSI table 130 and transmits the same to the server.

From the radio map 110, the server finds the coordinates corresponding to the RSSI values most similar to the RSSI values in the RSSI table 130. In the radio map 110, the RSSI values most similar to the RSSI values in the RSSI table 130 are −80 [dBm], −60 [dBm], and −60 [dBm], and the corresponding coordinates are (x3, y2).

The server determines the final position of the position-requesting terminal 120 as (x3, y2) and transmits the final position (x3, y2) to the position-requesting terminal 120.

Figure 2:
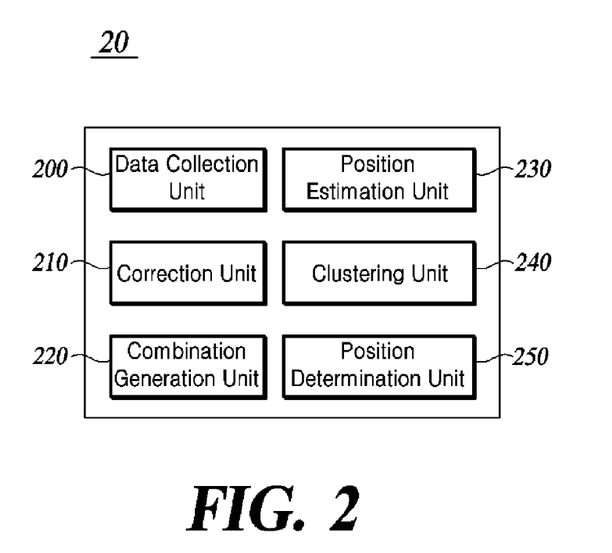
FIG. 2 is a diagram of the configuration of a positioning terminal according to at least one embodiment of the present disclosure.

FIG. 2 is a diagram of the configuration of a positioning terminal according to at least one embodiment of the present disclosure.

As shown in FIG. 2, the positioning terminal labeled 20 according to at least one embodiment of the present disclosure includes all or some of a data collection unit 200, a correction unit 210, a combination generation unit 220, a position estimation unit 230, a clustering unit 240, and a position determination unit 250.

Hereinafter, signals and data may be exchanged by using wireless communications between the terminal, the APs, and the server, where the wireless communications may refer to wireless fidelity (WiFi), Bluetooth, or ultra wideband (UWB) communications. However, they are merely exemplary wireless communication technologies, but are by no means limitive of the scope of the present disclosure, and may further utilize at least one communication technology among wireless communication technologies such as WiBro, long term evolution (LTE), 4G, 5G, and 6G mobile communication.

Additionally, the following describes the process and configuration for positioning of the terminal by using access points (APs), but the APs are merely example devices used for positioning of the terminal, and embodiments of the present disclosure are not so limiting. Specifically, along with wireless communications such as WiFi, Bluetooth, or UWB, not only the APs but also a beacon may be used, and along with wireless communications such as LTE, 5G, or 6G, base stations may be used instead of the APs.

The data collection unit 200 collects AP scan data from a plurality of APs located in the vicinity of the positioning terminal 20. Here, the AP scan data include a MAC address of each AP, its service set identifier (SSID), received signal strength indicator (RSSI), and timing data, where the timing data includes a round trip time (RTT), time of flight (ToF), time of arrival (TOA), or time difference of arrival (TDOA).

The correction unit 210 may correct the AP scan data collected by the data collection unit 200 by removing RSSI bias values included in the RSSIs or removing timing data bias values included in the timing data from among the AP scan data collected.

Here, bias values included in RSSIs or timing data occur due to the difference between chipsets or modules included in the respective ones of the positioning terminal 20 and the APs, and they are factors that may cause an error in the positioning. With multiples of the positioning terminal 20, the bias values between the respective positioning terminals and the APs may be different from each other or may be changed at any time. The correction unit 210 can remove even the varying bias values included in the RSSIs or timing data of the signals received by the data collection unit 200 from the APs.

The combination generation unit 220 combines the AP scan data collected by the data collection unit 200 or the plurality of AP scan data items corrected by the correction unit 210 in a predetermined unit.

For example, when the number of APs is n, and the data collection unit 200 collects n different AP scan data items from the n APs, the combination generation unit 220 according to at least one embodiment of the present disclosure may generate a plurality of data combinations by combining n AP scan data items in units of k. With the n AP scan data items combined in units of k, the total number of data combinations is C(n, k). Here, k is at least one integer of 3 or more to n or less. Here, in case of obtaining the two-dimensional coordinates of the positioning terminal 20, k is at least one integer of 3 or more to n or less. In case of obtaining the three-dimensional coordinates of the positioning terminal 20, k is at least one integer of 4 or more to n or less.

For example, when the number of APs is 5 (AP1, AP2, AP3, AP4, and AP5) and the data collection unit 200 collects five different AP scan data items (D1, D2, D3, D4, and D5) from the five APs, the combination generation unit 220 may generate data combinations obtained by combining five AP scan data items in units of 3. Specifically, the combination generation unit 220 may generate a total of 10 data combinations (D1, D2, D3), (D1, D2, D4), (D1, D2, D5), (D1, D3, D4), (D1, D3, D5), (D1, D4, D5) (D2, D3, D4), (D2, D3, D5), (D2, D4, D5), and (D3, D4, D5). The total number of data combinations is C(5, 3). Here, C(n, k) is a combination symbol that selects k data items from n different data items in no certain order.

The combination generation unit 220 according to at least one embodiment of the present disclosure selects a value of k arbitrarily or according to a pre-made table. Alternatively, the combination generation unit 220 may determine k as n/2 and as an integer closest to n/2 when n is an odd number.

Here, the pre-made table means a table that holds records of positioning accuracies and calculation speeds according to n and all k. A process of generating the pre-made table begins with collecting in advance, from n APs, n AP scan data items by the terminal at an arbitrary position, and generating a plurality of data combinations for all of the values of k with the plurality of data combinations being generated for each of the values of k. The final position of the terminal is determined by using a plurality of data combinations according to the k value. The next step is to record in the table the error between the actual position and the estimated position of the terminal for each k value and the time taken to estimate the position of the terminal.

This table is unlike the radio map by the fingerprint technique in which the region is divided into a grid with RSSIs being recorded at respective points, and it is subjected to no such frequent updates as with the radio map because the table is made depending on the number of APs and the number of data combinations. Therefore, by using the pre-made table in determination of a position the terminal, the maintenance cost can be reduced compared to using a radio map.

The combination generation unit 220 according to at least one embodiment combines the n AP scan data items in units of k that equals to at least one integer from 3 up to n in a manner to generate a plurality of data combinations for every one of k.

For example, the combination generation unit 220 may generate not only all data combinations by selecting three from the five AP scan data items but also all data combinations by selecting four or five AP scan data items. At this time, the number of all data combinations when calculated is C(5, 3)+C(5, 4)+C(5, 5)=16 data combinations.

The position estimation unit 230 may estimate preliminary positions of the positioning terminal 20 from the plurality of data combinations. The position estimation unit 230 may estimate the preliminary positions by using all of the plurality of data combinations or may estimate the preliminary positions by using only some of all the data combinations. Since the AP scan data includes RSSI or timing data, the plurality of data combinations obtained by combining AP scan data items include a plurality of RSSI combinations or a plurality of timing data combinations. The position estimation unit 230 estimates the preliminary positions of the positioning terminal 20 by using the plurality of RSSI combinations or the plurality of timing data combinations included in the plurality of data combinations. Here, the preliminary positions mean the positions of the positioning terminal 20 derived from the plurality of data combinations, respectively.

The position estimation unit 230 may use the fingerprint technique when using the plurality of RSSI combinations. In particular, the positioning terminal 20 first generates a radio map in advance as described referring to FIG. 1. Thereafter, the data collection unit 200 receives, from n APs, n RSSIs at the actual position of the positioning terminal 20 subject to positioning. The combination generation unit 220 generates a plurality of RSSI combinations by combining n RSSIs in units of k. The position estimation unit 230 compares the plurality of RSSI combinations with the radio map and estimates coordinates having the RSSI values most similar to the RSSI combination in the radio map as the preliminary position of the positioning terminal 20. Accordingly, the position estimation unit 230 may estimate preliminary positions as many as the number of RSSI combinations.

Meanwhile, the position estimation unit 230 may use multilateration when using a plurality of timing data combinations. In particular, the combination generation unit 220 first generates a plurality of timing data combinations by combining n timing data items in units of k. The position estimation unit 230 derives information on distances between the positioning terminal 20 and the respective APs from the plurality of timing data combinations. The position estimation unit 230 may estimate the preliminary positions of the positioning terminal 20 by applying the multilateration method to the distance information. To apply the multilateration method requires not only the distance between the AP and the terminal but also the position of the AP. The estimation of the position of the terminal may be performed by using distance information between the APs and the terminal and position information of the plurality of APs. Meanwhile, when k is 3, the position estimation unit 230 may estimate the preliminary position of the positioning terminal 20 for each timing data combination by using triangulation among multilateration techniques. When k is 4 or more, the position estimation unit 230 may estimate the preliminary position of the positioning terminal 20 by using multilateration for each timing data combination.

The clustering unit 240 may cluster a plurality of preliminary positions into at least one cluster according to the distances between the plurality of preliminary positions or the density of the plurality of preliminary positions, and it includes a machine learning model for clustering. The machine learning model includes unsupervised or pre-supervised models.

The clustering unit 240 may set a distance or a density in advance when clustering preliminary positions by using a supervised model. To this end, the clustering unit 240 may build and train a supervised learning model. The supervised learning model may be trained by using one or more algorithms. For example, the supervised learning model may be generated by using the K-means algorithm.

When clustering the preliminary positions by using the unsupervised learned model, the clustering unit 240 may cluster the preliminary positions by using a Density-Based Spatial Clustering of Applications with Noise (DBSCAN) algorithm.

The position determination unit 250 may select a cluster including the most preliminary positions among at least one or more clusters and use the representative value of the plurality of preliminary positions included in the selected cluster as the final position of the positioning terminal 20. Here, the representative value may be any one of an average value, a median value, a mode, a percentile, a quartile, or a trimmed mean of the plurality of preliminary positions included in the selected cluster.

Figure 3:
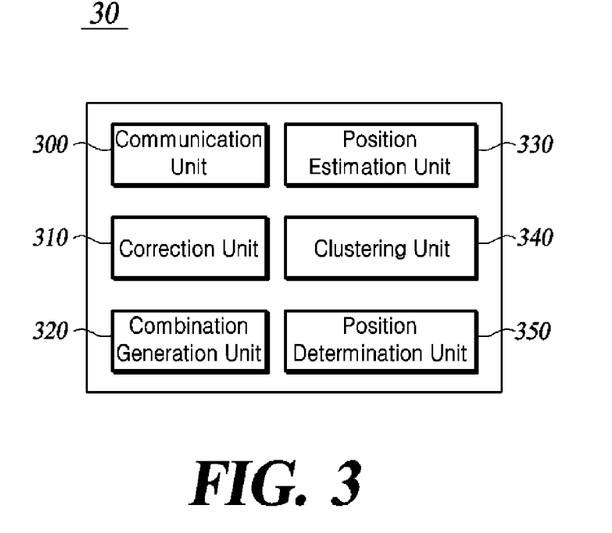
FIG. 3 is a diagram of the configuration of a positioning server according to at least one embodiment of the present disclosure.

FIG. 3 is a diagram of the configuration of a positioning server according to at least one embodiment of the present disclosure.

As shown in FIG. 3, the positioning server 30 according to at least one embodiment includes a communication unit 300, a correction unit 310, a combination generation unit 320, a position estimation unit 330, a clustering unit 340, and a position determination unit 350.

The communication unit 300 may receive the AP scan data from the position-requesting terminal and transmit the final position of the terminal determined by the position determination unit 350 to the terminal. The position-requesting terminal may transmit a request for positioning, and AP scan data received from the plurality of APs to the positioning server 30.

The positioning server 30 upon receiving the positioning request from the terminal through the communication unit 300 may determine the final position of the terminal by using the correction unit 310, combination generation unit 320, position estimation unit 330, clustering unit 340, and position determination unit 350. Then, the positioning server 30 may transmit the final position of the terminal through the communication unit 300 to the terminal.

A detailed description of the operation of the components of the positioning server 30 will be omitted because the components of the correction unit 310, combination generation unit 320, position estimation unit 330, clustering unit 340, and position determination unit 350 operate in the same way as the components of the positioning terminal 20 in FIG. 2.

Figure 4:
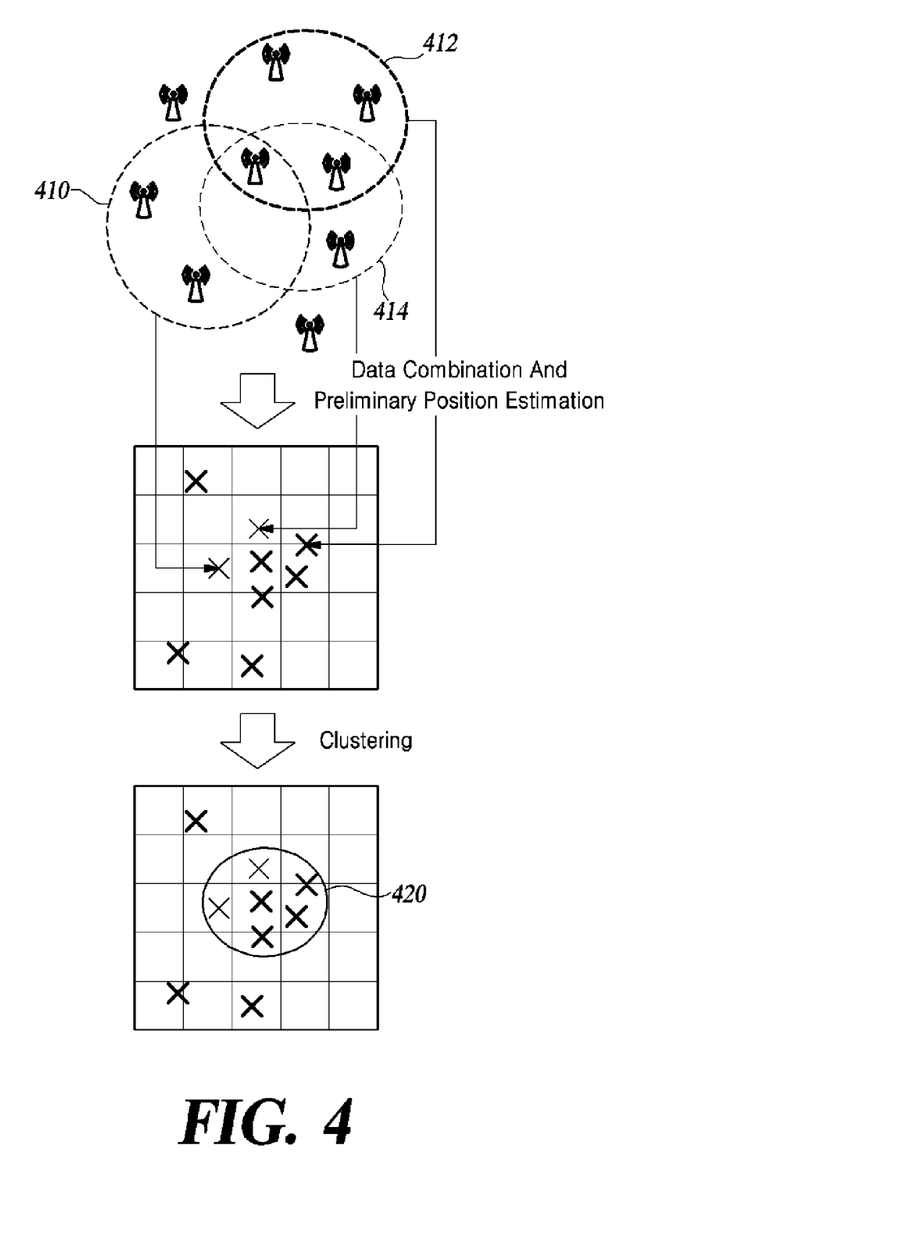
FIG. 4 is a diagram for illustrating a positioning method performed by a positioning terminal, according to at least one embodiment of the present disclosure.

FIG. 4 is a diagram for illustrating a positioning method performed by the positioning terminal, according to at least one embodiment of the present disclosure.

FIG. 4 illustrates a process of the terminal combining and clustering AP scan data collected from a plurality of APs.

The data collection unit 200 collects AP scan data from the APs. The combination generation unit 220 generates generate data combinations by combining the AP scan data items collected by the data collection unit 200 in units of k. A first data combination 410 and a third data combination 414 are each a combination of AP scan data collected from three APs, and a second data combination 412 is a combination of AP scan data collected from four APs.

The position estimation unit 230 estimates a preliminary position of the positioning terminal 20 by using the RSSI or timing data included in the first data combination 410. Similarly, the position estimation unit 230 estimates the preliminary positions of the positioning terminal 20 by performing the same operation for the second data combination 412 and the third data combination 414, and repeat the same operation for other data combinations.

Thereafter, the clustering unit 240 may generate at least one cluster 420 by clustering a plurality of preliminary positions of the positioning terminal 20.

The positioning terminal 20 according to at least one embodiment of the present disclosure determines a preliminary position not included in the cluster 420 as an outlier. Additionally, the positioning terminal 20 may track the data combination related to the preliminary position determined as an outlier and may track the APs used for the data combination. In other words, the positioning terminal 20 may track the APs that generated the outlier.

Although not shown in FIG. 4, when the clustering unit 240 generates two or more clusters, the position determination unit 250 may select the cluster 420 with the most preliminary positions of the positioning terminal 20. The position determination unit 250 determines a representative value of a plurality of preliminary positions included in the selected cluster 420 as the final position of the positioning terminal 20.

Figure 5A:
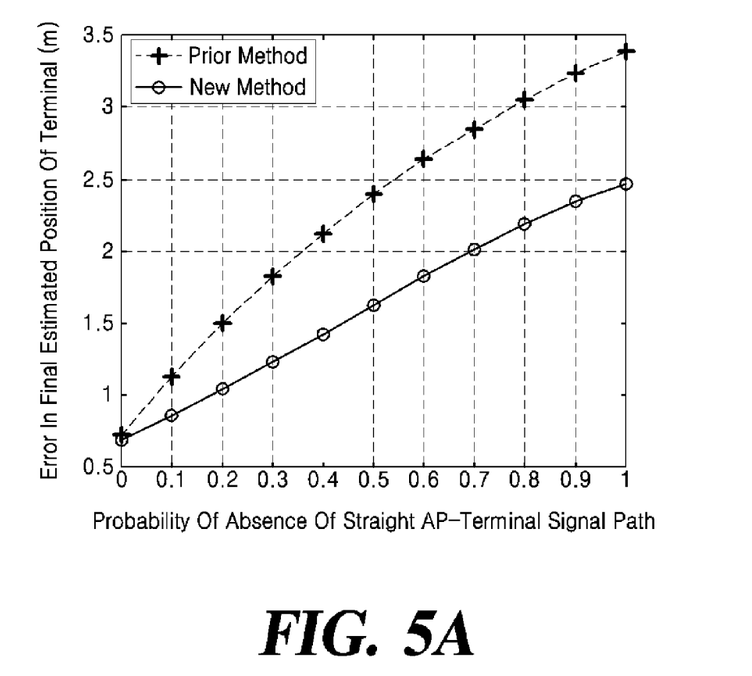
FIGS. 5A and 5B are diagrams for explaining the accuracy of the positioning method according to at least one embodiment of the present disclosure compared to the existing method using all AP scan data without AP scan data combinations for positioning of a terminal.
Figure 5B:
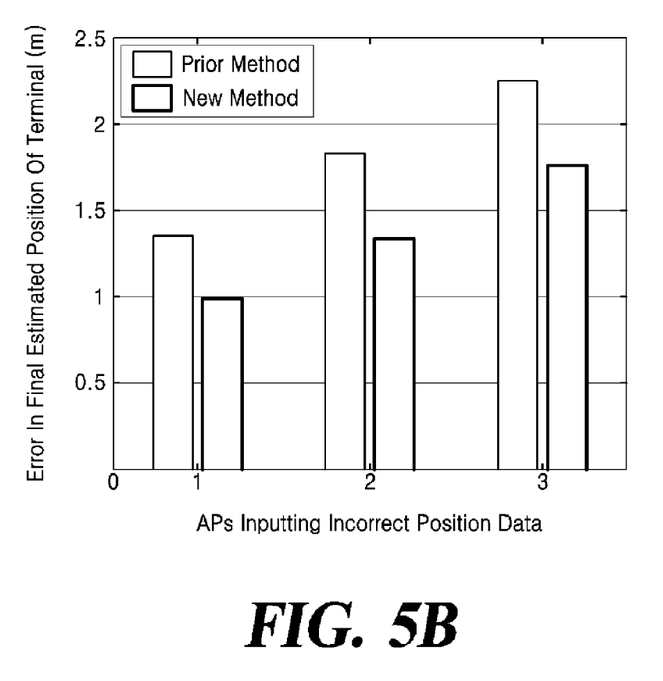

FIGS. 5A and 5B are diagrams for explaining the accuracy of the positioning method according to at least one embodiment of the present disclosure compared to the existing method using all AP scan data without AP scan data combinations for positioning of a terminal.

FIGS. 5A and 5B illustrate errors in estimated positions of the positioning terminal 20 in graphs, when a total of 10 APs are arranged at random positions in a space of 40 m each in width and length, multilateration is performed on the distances between the respective APs and the positioning terminal 20, and the position of the positioning terminal 20 is estimated.

Specifically, FIG. 5A shows graphs of final position errors of the positioning terminal 20 in relation to the probability of absence of wireless signal transmission path among the paths through which wireless signals are transmitted between the positioning terminal 20 and the APs.

At 0 probability of absence of straight AP-terminal signal path, that is, when straight signal paths have a very real presence between the APs and the terminal, there is hardly a visible difference between the final position error according to the existing method and the final position error according to an embodiment of the present disclosure.

However, with the increasing probability of absence of straight AP-terminal signal path, that is, the less the straight AP-terminal signal paths are present, the significantly fewer errors are present in estimated positions of the positioning terminal than the final position errors according to the existing method. Specifically, when 1 is the probability of absence of straight AP-terminal signal path, the error in the final estimated terminal position is just 2.5 m as opposed to about 3.5 m of the final position error according to the conventional method. In other words, the final position according to at least one embodiment of the present disclosure is more accurate than that of the conventional method by a maximum distance of 1 m.

On the other hand, FIG. 5B shows graphs of final position errors of the positioning terminal according to at least one embodiment in comparison with those of the conventional method where incorrect AP positions are known for when applying the multilateration, that is, where positioning is performed under the condition that some APs are removed or relocated among multiple APs.

As the graphs exhibit, with the increasing number of removed or relocated APs, the final position errors tend to increase according to both the existing method and at least one embodiment of the present disclosure.

However, the final position errors according to the present disclosure are smaller than those of the conventional method. Additionally, with the increasing number of removed or relocated APs, the difference increases between the errors according to the existing method and the errors according to the embodiment of the present disclosure. Specifically, where 1 (one) AP is removed or relocated, the final position error is about 1.4 m according to the existing method, whereas the final position error is 1 m according to at least one embodiment of the present disclosure, resulting in a difference by about 0.4 m. When 3 (three) APs are inputting incorrect position information, the final position error is about 2.3 m according to the conventional method, whereas the final position error is about 1.3 m according to s at least one embodiment of the present disclosure, resulting in a difference by about 1 m. In other words, the greater the number of APs removed or relocated, the smaller the rate of final position errors becomes in the present disclosure compared to existing methods.

Therefore, the positioning method according to at least one embodiment of the present disclosure can determine the position of the terminal more accurately than the existing methods even with an AP that has been removed or relocated.

Figure 6:
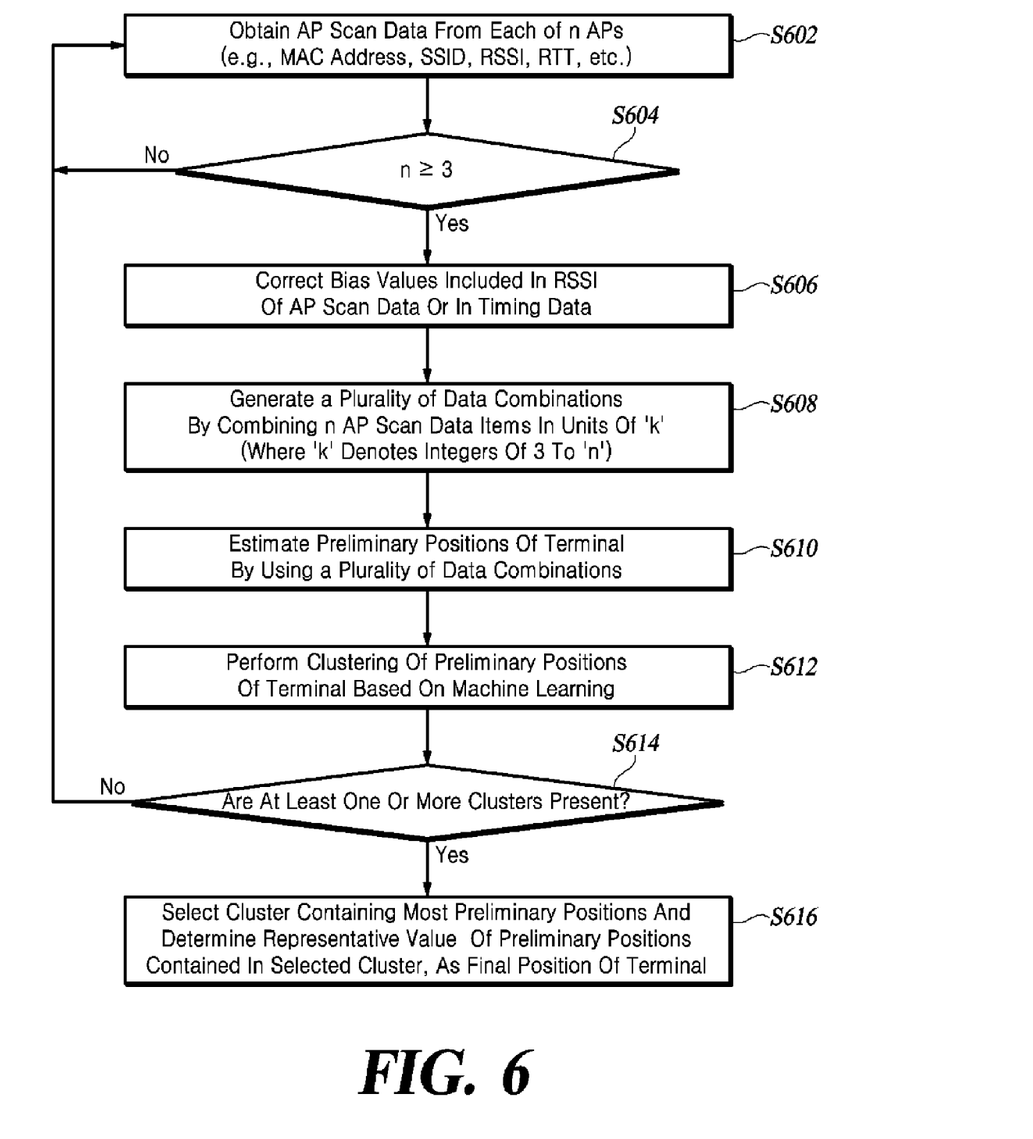
FIG. 6 is a flowchart of a process of estimating the position of a positioning terminal by using some of multiple data combinations according to at least one embodiment of the present disclosure.

FIG. 6 is a flowchart of a process of estimating the position of the positioning terminal by using some of multiple data combinations according to at least one embodiment of the present disclosure.

First, the data collection unit 200 of the positioning terminal 20 collects n AP scan data items from each of the n APs (S602). Here, the AP scan data includes a MAC address of each AP, its service set identifier (SSID), RSSI, and timing data.

The positioning terminal 20 determines whether three or more AP scan data items are collected by the data collection unit 200 (S604). When measuring the 3D spatial position of the positioning terminal 20 according to at least one embodiment of the present disclosure, the positioning terminal 20 may determine whether the number of AP scan data items is four or more.

If yes, or when the number of AP scan data items collected by the data collection unit 200 is three or more, the correction unit 210 receives RSSIs or timing data included in the AP scan data from the data collection unit 200 and removes RSSI bias values included in the RSSIs and timing data bias values included in the timing data (S606). On the other hand, when two or less is the number of AP scan data collected by the data collection unit 200, the data collection unit 200 of the positioning terminal 20 performs another collection of AP scan data from the APs.

The combination generation unit 220 generates a plurality of data combinations by combining n AP scan data items in units of k (S608). Here, when measuring the two-dimensional position of the positioning terminal 20, k is at least one integer from 3 or more to n or less. When measuring the three-dimensional position of the positioning terminal 20, k is at least one integer from 4 or more to n or less.

The combination generation unit 220 according to at least one embodiment of the present disclosure combines the n scan data items in units of k while generating data combinations only for one or some specific k, not all values of k. For example, k may be any one or more integers of n/2 or integers from 3 up to n. Additionally, k may be one or more values based on a pre-made table which refers to a table that holds records of the terminal's positioning accuracies and operation speeds according to n and k values.

The position estimation unit 230 estimates the preliminary positions of the terminal by using a plurality of data combinations generated by the combination generation unit 220 (S610). When using a plurality of RSSI combinations in the plurality of data combinations, the position estimation unit 230 may estimate preliminary positions of the positioning terminal 20 by applying a fingerprint technique to the plurality of RSSI combinations. Additionally, when using a plurality of timing data combinations in the plurality of data combinations, the position estimation unit 230 may estimate the preliminary positions of the positioning terminal 20 by applying the multilateration method to the distances obtained from the plurality of timing data combinations.

The clustering unit 240 may cluster a plurality of preliminary positions of the positioning terminal 20 based on machine learning (S612). Specifically, the machine learning model of the clustering unit 240 includes a supervised machine learning model and an unsupervised machine learning model that can cluster a plurality of preliminary positions as at least one cluster according to the density or distance.

The positioning terminal 20 determines whether at least one or more clusters are generated by the clustering unit 240 (S614).

When the clustering unit 240 generates a plurality of clusters, the position determination unit 250 selects a cluster including the most preliminary positions and determines a representative value of the preliminary positions included in the selected cluster as the final terminal of the terminal (S616). On the other hand, when the clustering unit 240 fails to generate even one cluster, the data collection unit 200 of the positioning terminal 20 performs another collection of AP scan data from the APs.

Figure 7:
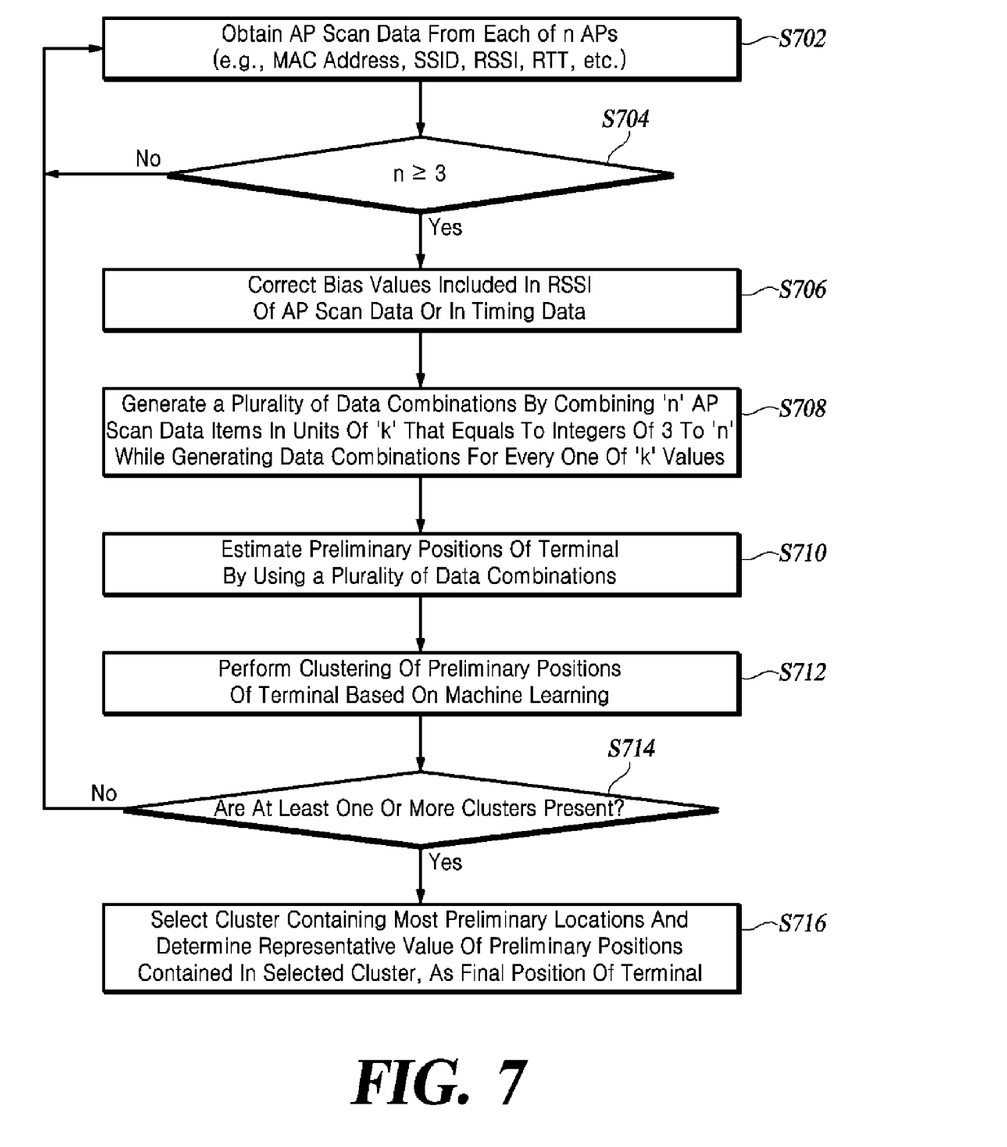
FIG. 7 is a flowchart of a process of estimating the position of a positioning terminal by using all of a plurality of data combinations according to at least one embodiment of the present disclosure.

FIG. 7 is a flowchart of a process of estimating the position of the positioning terminal by using all of a plurality of data combinations according to at least one embodiment of the present disclosure.

The data collection unit 200 of the positioning terminal 20 collects n AP scan data items from the n APs, respectively (S702).

The positioning terminal 20 determines whether three or more is the number of AP scan data items collected by the data collection unit 200 (S704).

If yes, or when the number of AP scan data items collected by the data collection unit 200 is three or more, the correction unit 210 receives RSSIs or timing data included in the AP scan data items from the data collection unit 200, and removes RSSI bias values included in the RSSIs and timing data bias values included in the timing data (S706). On the other hand, when two or less is the number of AP scan data items collected by the data collection unit 200, the data collection unit 200 of the positioning terminal 20 performs another collection of AP scan data from the APs.

The combination generation unit 220 generates a plurality of data combinations by combining n AP scan data items in units of k (S708).

The combination generation unit 220 according to at least one embodiment of the present disclosure combines n scan data items in units of k while generating data combinations for all k values corresponding to at least one or more integers from 3 or more to n or less. For example, when combining 5 AP scan data items, the combination generation unit 220 may generate 10 data combinations by combining 3 out of the 5 AP scan data items. The combination generation unit 220 may generate 5 data combinations by combining 4 AP scan data items out of 5. The combination generation unit 220 may generate 1 data combination by combining 5 AP scan data items out of 5. As a result, the combination generation unit 220 may combine 5 AP scan data items to generate a total of 16 data combinations.

The position estimation unit 230 estimates preliminary positions of the terminal by using the plurality of data combinations generated by the combination generation unit 220 (S710).

The clustering unit 240 may cluster the plurality of preliminary positions of the positioning terminal 20 based on machine learning (S712).

The positioning terminal 20 determines whether at least one or more clusters are generated by the clustering unit 240 (S714).

When the clustering unit 240 generates a plurality of clusters, the position determination unit 250 selects a cluster including the most reserved positions and determines a representative value of the preliminary positions included in the selected cluster as the final terminal of the terminal (S716). On the other hand, when the clustering unit 240 fails to generate even one cluster, the data collection unit 200 of the positioning terminal 20 re-performs the collection of AP scan data from the APs.

Although Steps S602 to S716 in FIGS. 6 and 7 are described to be sequentially performed, they merely instantiate the technical idea of some embodiments of the present disclosure. Therefore, a person having ordinary skill in the pertinent art could appreciate that various modifications, additions, and substitutions are possible by changing the sequences described in the respective drawings or by performing two or more of Steps S602 to S716 in FIGS. 6 and 7 in parallel, without departing from the gist and the nature of the embodiments of the present disclosure, and hence the steps in FIGS. 6 and 7 are not limited to the illustrated chronological sequences.

The steps shown in FIGS. 6 and 7 can be implemented as computer-readable codes on a computer-readable recording medium. The computer-readable recording medium include any type of recording device on which data that can be read by a computer system are recordable. Examples of the computer-readable recording medium include a magnetic recording medium (e.g., a ROM, a floppy disk, a hard disk, etc.), an optically readable medium (e.g., a CD-ROM, a DVD, etc.), and the like. Further, the computer-readable recording medium can be distributed in computer systems connected via a network, wherein computer-readable codes can be stored and executed in a distributed mode.

According to at least one embodiment of the present disclosure, a position of a terminal can be determined by not making a radio map for terminal positioning and instead combining a plurality of AP scan data transmitted with a positioning request of the terminal and using the combined AP scan data items to obviate the need for a radio map preparation and thereby reduce the maintenance cost and repair cost for terminal positioning.

According to at least one embodiment of the present disclosure, the position of the terminal can be determined by making a radio map in advance of terminal positioning and combining and using AP scan data items in positioning the terminal despite changes in the position, number, or state of the APs to increase the update period of the radio map, thereby reducing the maintenance cost and repair cost of the radio map for terminal positioning.

As described above, according to at least one embodiment of the present disclosure, the position of the terminal can be determined by using the AP scan data inclusive of an error-prone AP and further deriving a plurality of preliminary positions of the terminal from data combinations of the plurality of AP scan data items from the plurality of APs, thereby improving the accuracy of positioning.

According to at least one embodiment of the present disclosure, the position of the terminal can be determined by removing bias values included in RSSIs or timing data among the AP scan data received from the plurality of APs to correct the AP scan data, thereby improving the accuracy and reliability of the terminal positioning.

At least one of the components, elements, modules or units (collectively "units" in this paragraph) represented by a block in the drawings such as FIGS. 2 and 3 may be embodied as various numbers of hardware, software and/or firmware structures that execute respective functions described above, according to an example embodiment. According to embodiments, at least one of these units may use a direct circuit structure, such as a memory, a processor, a logic circuit, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Further, at least one of these units may include or may be implemented by a processor such as a central processing unit (CPU) that performs the respective functions, a microprocessor, or the like. Two or more of these units may be combined into one single component which performs all operations or functions of the combined two or more components. Also, at least part of functions of at least one of these components may be performed by another of these units. Functional aspects of the above embodiments may be implemented in algorithms that execute on one or more processors. Furthermore, the units represented by a block or processing steps may employ any number of related art techniques for electronics configuration, signal processing and/or control, data processing and the like.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A wireless terminal configured to determine a position of itself by using one or more data combinations, the wireless terminal comprising a processor configured to:
    collect n access point (AP) scan data items from each of n APs, where n is a natural number greater than or equal to 4, wherein the AP scan data items include Received Signal Strength Indicators (RSSIs) or timing data;
    generate a plurality of data combinations by combining the n AP scan data items in units of k APs, where the k value is at least one integer from 3 up to n, wherein each data combination comprises at least one different AP scan data item;
    estimate a plurality of preliminary positions of the wireless terminal from the plurality of data combinations, respectively;
    cluster the plurality of preliminary positions into at least one cluster according to distances or densities of the plurality of preliminary positions; and
    determine a final position of the wireless terminal based on the at least one cluster.

2. The wireless terminal of claim 1, wherein the processor is further configured to generate a plurality of data combinations for every k value corresponding to 3 up to n.

3. The wireless terminal of claim 2, wherein the processor is further configured to estimate the plurality of preliminary positions of the wireless terminal from some combinations of the plurality of data combinations.

4. The wireless terminal of claim 1, wherein the k value is determined according to a table that is pre-made and holds records of positioning accuracies and calculation speeds according to the n APs and all k values.

5. The wireless terminal of claim 1, wherein the processor is further configured to select from the at least one or more clusters a cluster including most preliminary positions, and determine a representative value of the preliminary positions included in a selected cluster as the final position of the wireless terminal, the representative value being any one of an average value, a median value, a mode, a percentile, a quartile, or a trimmed mean.

6. The wireless terminal of claim 1, wherein the processor is further configured to:
    when the AP scan data items include RSSIs, estimate the plurality of preliminary positions of the wireless terminal by using a plurality of RSSI combinations and a radio map that is pre-made; and
    when the AP scan data items include the timing data, estimate the plurality of preliminary positions of the wireless terminal by using a plurality of timing data combinations and multilateration,
    wherein the timing data is any one of Round Trip Time (RTT), Time of Arrival (ToA), Time Difference of Arrival (TDoA), or Time of Flight (ToF).

7. The wireless terminal of claim 6, wherein the processor is further configured to:
    correct the AP scan data items by removing RSSI bias values included in the RSSIs or removing timing data bias values included in the timing data.

8. A positioning server using one or more data combinations, comprising a processor configured to:
    receive, from a wireless terminal, n access point (AP) scan data items collected by the wireless terminal from each of n APs, where n is a natural number greater than or equal to 4, wherein the AP scan data items include Received Signal Strength Indicators (RSSIs) or timing data;
    generate a plurality of data combinations by combining the n AP scan data items in units of k APs, where the k value is at least one integer from 3 up to n, wherein each data combination comprises at least one different AP scan data item;
    estimate a plurality of preliminary positions of the wireless terminal from the plurality of data combinations, respectively;
    cluster the plurality of preliminary positions into at least one cluster based on distances or densities of the plurality of preliminary positions; and
    determine a final position of the wireless terminal based on the at least one cluster.

9. The positioning server of claim 8, wherein the processor is further configured to generate a plurality of data combinations for every k value corresponding to 3 up to n.

10. The positioning server of claim 9, wherein the processor is further configured to estimate the plurality of preliminary positions of the wireless terminal from some combinations of the plurality of data combinations.

11. The positioning server of claim 8, wherein the k value is determined according to a table that is pre-made and holds records of positioning accuracies and calculation speeds according to the n APs and all k values.

12. The positioning server of claim 8, wherein the processor is further configured to select from the at least one or more clusters a cluster including most preliminary positions and determine a representative value of the preliminary positions included in a selected cluster as the final position of the wireless terminal, the representative value being any one of an average value, a median value, a mode, a percentile, a quartile, or a trimmed mean.

13. The positioning server of claim 8, wherein the processor is further configured to:
when the AP scan data items include RSSIs, estimate the plurality of preliminary positions of the wireless terminal by using a plurality of RSSI combinations and a radio map that is pre-made; and
when the AP scan data items include the timing data, estimate the plurality of preliminary positions of the wireless terminal by using a plurality of timing data combinations and multilateration,
wherein the timing data is any one of RTT, ToA, TDoA, or ToF.

14. The positioning server of claim 13, wherein the processor is further configured to:
correct the AP scan data items by removing RSSI bias values included in the RSSIs or removing timing data bias values included in the timing data.

15. A positioning method performed by a positioning server using one or more data combinations, comprising:
receiving, from a wireless terminal, n access point (AP) scan data items collected by the wireless terminal from each of n APs, where n is a natural number greater than or equal to 4, wherein the AP scan data items include Received Signal Strength Indicators (RSSIs) or timing data;
generating a plurality of data combinations by combining the n AP scan data items in units of k APs, where the k value is at least one integer from 3 up to n, wherein each data combination comprises at least one different AP scan data item;
estimating a plurality of preliminary positions of the wireless terminal from the plurality of data combinations, respectively;
clustering the plurality of preliminary positions into at least one cluster based on distances or densities of the plurality of preliminary positions; and
determining a final position of the wireless terminal based on the at least one cluster.

16. The positioning method of claim 15, further comprising:
generating a plurality of data combinations for every k value corresponding to 3 up to n.

17. The positioning method of claim 16, wherein the estimating of the plurality of preliminary positions comprises:
estimating the plurality of preliminary positions of the wireless terminal from some combinations of the plurality of data combinations.

18. The positioning method of claim 15, wherein the k value is determined according to a table that is pre-made and holds records of positioning accuracies and calculation speeds according to the n APs and all k values.

19. The positioning method of claim 15, wherein the determining of the final position comprises:
selecting from the at least one or more clusters a cluster including most preliminary positions and determining a representative value of the preliminary positions included in a selected cluster as the final position of the wireless terminal, the representative value being any one of an average value, a median value, a mode, a percentile, a quartile, or a trimmed mean.

20. The positioning method of claim 15, further comprising:
when the AP scan data items include RSSIs, correcting the AP scan data items by removing RSSI bias values included in the RSSIs; and
when the AP scan data items include the timing data, correcting the AP scan data items by removing timing data bias values included in the timing data.

* * * * *